3,714,953
PRESSURE RELIEF VALVE
Paul O. Solvang, Tacoma, Wash., assignor to National Water-Blast Inc., Tacoma, Wash.
Filed Oct. 20, 1971, Ser. No. 190,928
Int. Cl. F16k 15/02
U.S. Cl. 137—14
12 Claims

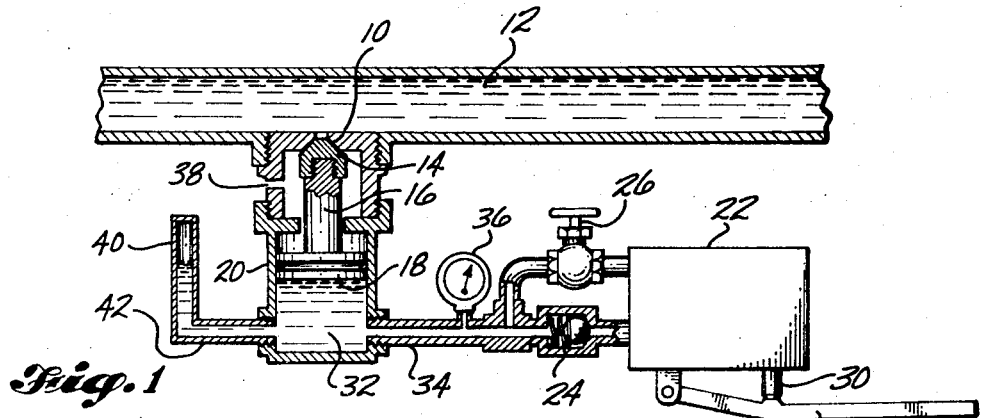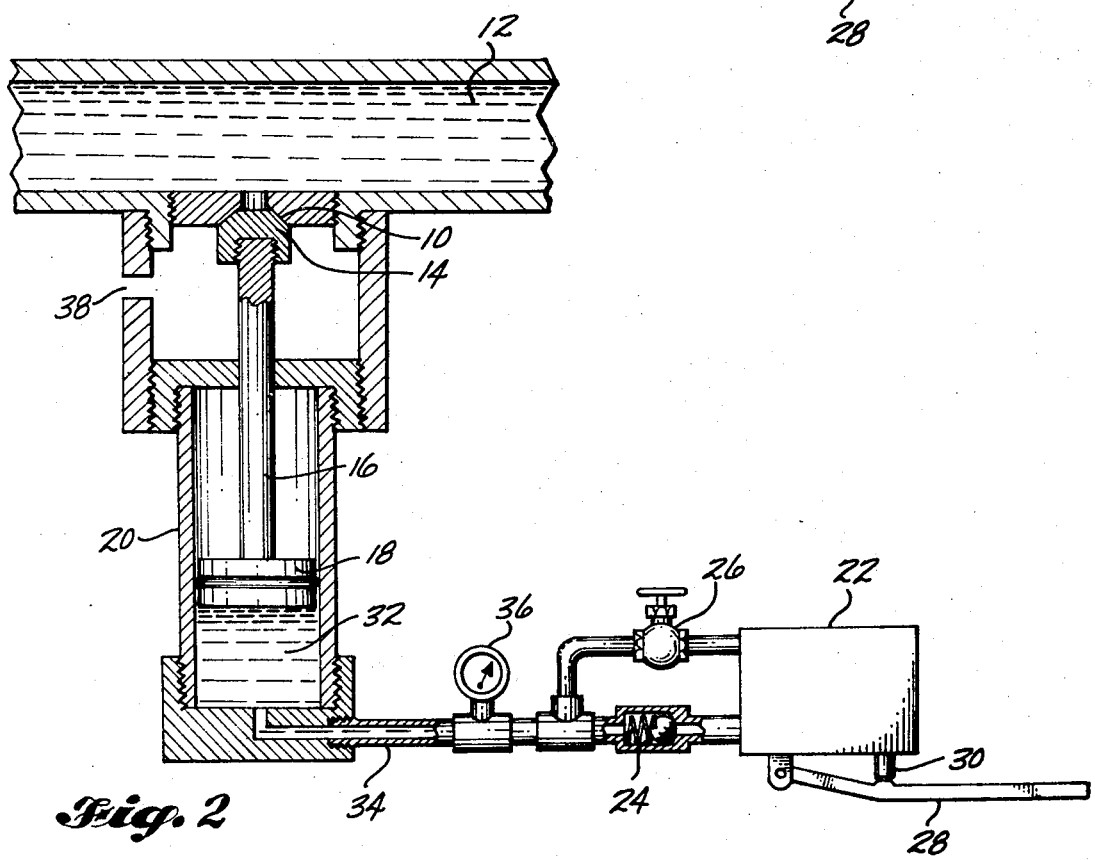

ABSTRACT OF THE DISCLOSURE

An apparatus and method of relieving excess fluid pressure using a hydraulic cylinder to urge a hydraulic plug against a valve seat in communication with the fluid to be controlled. The hydraulic fluid used in the hydraulic cylinder is selected to have a compressibility at least as great as the compressibility of a paraffinic base mineral oil having a viscosity of about 20 to 50 centipoises at 25° C. to act as a liquid spring in response to excess fluid pressure. Also disclosed is the use of an air chamber in communication with the hydraulic fluid in the hydraulic cylinder which in combination with ordinary hydraulic fluid acts as a fluid spring.

BACKGROUND OF THE INVENTION

Pressure relief or pop-off type valves are usually of a spring loaded type. These types of pressure control valves have been extremely successful. However, at high pressures there is a danger of tightening the spring down until there is no spring left. Water blasts units are presently using pressures up to 50,000 p.s.i. and higher. It was discovered a hydraulic cylinder when used to hold a valve plug against a valve seat, and when using a compressible hydraulic fluid in the cylinder would act as a relief valve at all pressures.

SUMMARY OF THE INVENTION

A pressure relief system wherein a valve plug held in position against a valve seat by a hydraulic cylinder actuated by a compressible hydraulic fluid relieves a surge in pressure in a fluid, to be controlled, due to the compressibility of the hydraulic fluid. A hydraulic pump pressurizes the hydraulic fluid in the hydraulic cylinder and the pressure is maintained to hold a valve plug fastened to the end of the cylinder piston rod against the valve seat. A surge in pressure in the fluid line to be controlled transmits the pressure from that surge against the valve plug through the piston rod and piston thence into the hydraulic fluid. The compressibility of the hydraulic fluid allows the valve plug to be moved off the valve seat to relieve pressure in the controlled fluid line.

It has been discovered that hydraulic fluids at least as compressible as a paraffinic base mineral oil having a viscosity of about 20 to 50 centipoises at 25° C. performed well in this pressure relief system. These mineral oils have about 2 to 3 percent compression at 10,000 p.s.i. and about 5 to 6 percent compression at 20,000 p.s.i. Silicone fluids may be obtained that are highly compressible. The more compressible of these silicones are the dimethyl polysiloxanes and the methyl phenyl polysiloxanes. Compressibility up to 8 percent at 10,000 p.s.i., 12 percent at 20,000 p.s.i., and up to 19 percent at 50,000 p.s.i. are available. Mineral oil, or dimethyl polysiloxane having a viscosity of from about 0.65 to 100 centipoises at 25° C., or methyl phenyl polysiloxane having a viscosity of from about 50 to 100 centipoises at 25° C. may be used when practicing this invention. These fluids are shown by way of example only and are not intended to limit the fluids that may be used, as any fluid having the requisite compressibility will perform satisfactorily.

In another embodiment of this invention an air chamber may be placed in communication with the hydraulic fluid to act as a compressible media. The air chamber may be used in combination with a hydraulic fluid that is essentially incompressible in which case air trapped in the air chamber is the compressible media; or it may be used in combination with a compressible type hydraulic fluid.

An object of this invention is to obtain a pressure relief apparatus.

Another object of this invention is to obtain a reliable pressure relief apparatus for controlling extremely high pressures.

Still another object of this invention is to obtain a pressure relief apparatus suitable for water blast applications.

DESCRIPTION OF THE DRAWINGS

FIG. 1 is a side elevation of the pressure relief apparatus with air chamber. The elevation is partially cut away to disclose the inner workings of the valve cylinder and hydraulic system.

FIG. 2 is a side elevation of the pressure relief apparatus without air chamber. The elevation is partially cut away for clarity.

DETAILED DESCRIPTION

The two views show slightly different configurations for the cylinders, however, common parts will be given the same number in each configuration.

Valve seat 10 is in communication with fluid 12, the pressure of which is to be controlled. Valve plug 14 is fastened to the end of piston rod 16, which is connected to piston 18, of hydraulic cylinder 20.

Hydraulic pump 22 may be of any type of conventional pump, it may have internal check valve and pressure release valve or it may have these accessories external as shown in these drawings with check valve 24, and pressure release valve 26. The pump may be power operated, however in the preferred embodiment it is hand operated as shown with pump handle 28, and pump plunger 30. The pump introduces hydraulic fluid 32, under pressure through line 34, into the cylinder 20, to urge valve plug 14 against seat 10, to contain fluid 12.

When operating, valve 26 is closed off and the handle 28 actuated to pressurize the hydraulic fluid 32. In FIG. 2, the hydraulic fluid is selected to have a compressibility at least as great as a compressibility of about 2 to 3 percent at 10,000 p.s.i. and at least 5 to 6 percent at 20,000 p.s.i. The handle is operated until the desired pressure is reached as registered on gage 36. The desired pressure is the amount necessary to hold valve plug 14, against valve seat 10 with sufficient force to just contain the required operating pressure in fluid 12. Check valve 24 maintains the desired pressure in hydraulic fluid 32. A surge of pressure in fluid 12 acts against the valve plug and the compressibility of the hydraulic fluid allows the valve plug to move away from the valve seat to release pressure in fluid 12, and dump the released fluid through opening 38.

In another preferred embodiment, see FIG. 1, air chamber 40 communicates through line 42, with the hydraulic fluid 32, in the hydraulic cylinder 20. In this embodiment the hydraulic fluid may be essentially incompressible as the trapped gas in the air chamber acts as the compressible media; or it may be used in combination with a compressible hydraulic fluid.

I claim:

1. A pressure relief apparatus, for controlling fluid pressure, having a hydraulic cylinder for urging a valve plug against a valve seat comprising:

(a) a hydraulic fluid, for the hydraulic cylinder, having a compressibility at least as great as the compressibility of a paraffinic base mineral oil having a viscosity of about 20 to 50 centipoises at 25° C. to allow movement of the valve plug away from the valve seat in response to a pressure surge in the fluid to be controlled; and (b) means for pressurizing the hydraulic cylinder with the hydraulic fluid.

2. A pressure relief apparatus, for controlling fluid pressure, having a hydraulic cylinder for urging a valve plug against a valve seat comprising:

(a) a hydraulic fluid, for the hydraulic cylinder, having a compressibility at least as great as 2 to 3 percent at 10,000 p.s.i. and 5 to 6 percent at 20,000 p.s.i. to allow movement of the valve plug away from the valve seat in response to a pressure surge in the fluid to be controlled; and (b) means for pressurizing the hydraulic cylinder with the hydraulic fluid.

3. A pressure relief valve for controlling fluid pressure comprising:

(a) a valve seat in communication with a fluid under pressure;

(b) a hydraulic cylinder with a piston and piston rod, having a valve plug fastened to the end of the piston rod, mounted to move the valve plug against the valve seat and stop off the fluid when the piston rod is extended, and such that fluid pressure tends to move the valve plug away from the valve seat to relieve pressure and dump fluid;

(c) a hydraulic fluid, for the hydraulic cylinder, having a compressibility at least as great as 2 to 3 percent at 10,000 p.s.i. and 5 to 6 percent at 20,000 p.s.i. to allow movement of the valve plug away from the valve seat in response to a pressure surge in the fluid to be controlled; and (d) means for pressuring the hydraulic cylinder with the hydraulic fluid to maintain a constant pressure.

4. A pressure relief valve as in claim 3, wherein the hydraulic fluid is a paraffinic base mineral oil having a viscosity of about 20 to 50 centipoises at 25° C.

5. A pressure relief valve as in claim 3, wherein the means for pressurizing the hydraulic cylinder with the hydraulic fluid comprises: a hand operated hydraulic pump, a line running from the hydraulic pump to the hydraulic cylinder, and a check valve to maintain pressure of the fluid.

6. A pressure relief apparatus having a hydraulic cylinder for urging a valve plug against a valve seat to contain a fluid under pressure comprising:

(a) means for pressurizing the hydraulic cylinder with a hydraulic fluid and maintaining said pressure, and (b) an air chamber in communication with the pressurized hydraulic fluid, to allow movement of the valve plug away from the valve seat in response to a pressure surge in the contained fluid.

7. A pressure relief apparatus as in claim 6, wherein the means for pressurizing and maintaining pressure in the hydraulic cylinder comprises: a hand operated hydraulic pump, a check valve, and a line communicating between the pump and the hydraulic cylinder.

8. A pressure relief apparatus as in claim 7, further comprising: a hydraulic fluid having compressibility at least as great the compressibility of a paraffinic base mineral oil having a viscosity of about 20 to 50 centipoises at 25° C.

9. A method of relieving fluid pressure utilizing a hydraulic cylinder to urge a valve plug against a valve seat in communication with fluid to be controlled, wherein the steps comprise:

(a) introducing a hydraulic fluid, having a compressibility of at least 2 to 3 percent at 10,000 p.s.i. and of at least 5 to 6 percent at 20,000 p.s.i. into the hydraulic cylinder to urge the valve plug against the valve seat; and (b) maintaining a constant pressure on the hydraulic fluid.

10. A method of relieving fluid pressure utilizing a hydraulic cylinder to urge a valve plug against a valve seat in communication with fluid to be controlled, wherein the steps comprise:

(a) utilizing a hydraulic fluid from materials having a compressibility at least as great as a paraffinic base mineral oil having a viscosity of about 20 to 50 centipoises at 25° C.;

(b) pumping the hydraulic fluid into the hydraulic cylinder with a hand operated pump until reaching the desired pressure; and (c) maintaining the pressure in the hydraulic fluid.

11. A method of relieving fluid pressure utilizing a hydraulic clyinder to urge a valve plug against a valve seat in communication with fluid to be controlled, wherein the steps comprise:

(a) placing an air chamber such that the air chamber will be in communication with hydraulic fluid that may be introduced into the hydraulic cylinder;

(b) pressurizing the hydraulic cylinder with hydraulic fluid to hold the valve plug against the valve seat; and (c) maintaining a constant pressure on the hydraulic fluid.

12. A method of relieving fluid pressure as in claim 11, further comprising: selecting the hydraulic fluid to have a compressibility greater than the compressibility of a paraffinic base mineral oil having a viscosity of about 20 to 50 centipoises at 25 C.

References Cited

UNITED STATES PATENTS

| 2,179,003 | 11/1939 | Allen | 137—528 |
| 3,437,110 | 4/1969 | Birdwell | 137—528 |
| 3,508,577 | 4/1970 | Vincent et al. | 137—528 |
| 3,636,969 | 1/1972 | Jacobellis | 137—115 |

ROBERT G. NILSON, Primary Examiner

U.S. Cl. X.R.

137—528